(12) United States Patent
Aldridge et al.

(10) Patent No.: US 10,095,648 B2
(45) Date of Patent: Oct. 9, 2018

(54) CANTILEVERED NETWORK INTERFACE CARD ASSEMBLY HAVING PORT CONNECTOR ACCESSIBLE FROM REGION OUTSIDE OF COMPUTING DEVICE

(71) Applicant: HEWLETT-PACKARD DEVELOPMENT COMPANY, L.P., Houston, TX (US)

(72) Inventors: Randol D. Aldridge, Houston, TX (US); James Smalls, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 236 days.

(21) Appl. No.: 15/090,018

(22) Filed: Apr. 4, 2016

(65) Prior Publication Data
US 2017/0286346 A1 Oct. 5, 2017

(51) Int. Cl.
*G06F 13/00* (2006.01)
*G06F 13/40* (2006.01)
*G06F 13/42* (2006.01)

(52) U.S. Cl.
CPC ...... *G06F 13/4068* (2013.01); *G06F 13/4045* (2013.01); *G06F 13/4282* (2013.01)

(58) Field of Classification Search
CPC .......................... G06F 13/4022; G06F 13/4068
See application file for complete search history.

(56) References Cited

U.S. PATENT DOCUMENTS

| | | | |
|---|---|---|---|
| 7,551,850 B2 | 6/2009 | Alana | |
| 9,081,907 B2 | 7/2015 | Hershko | |
| 9,396,149 B2* | 7/2016 | Choi | G06F 13/4022 |
| 2014/0365699 A1 | 12/2014 | Barga | |
| 2016/0041937 A1* | 2/2016 | Aldridge | G06F 1/185 |
| | | | 710/313 |

FOREIGN PATENT DOCUMENTS

| | | |
|---|---|---|
| CN | 203690574 U | 7/2014 |
| WO | 2014149039 | 9/2014 |
| WO | 2016018345 | 2/2016 |

OTHER PUBLICATIONS http://www.hwtools.net/PDF/M2P4S_brief.pdf; "M.2 (NGFF) PCIe base SSD to PCIe X4 Adapter"; Bplust Tech Professional I/O adapter provider; BPLUS Technology Co., Ltd.; Copyright © 2009-2013 Bplus Tech. Corporation.

* cited by examiner

*Primary Examiner* — Tammara R Peyton
(74) *Attorney, Agent, or Firm* — Trop, Pruner, Hu, P.C.

(57) ABSTRACT

An apparatus includes a circuit card substrate that is associated with a network interface card. The circuit card substrate includes a connector edge to be received in a connector that is nominally associated with a slot to receive an expansion card that, when installed in a computing device, is physically enclosed within the computing device. The apparatus includes a port connector that is mounted to the circuit card substrate. The port connector is to be accessible from a region outside of the computing device when the connector edge of the circuit card substrate is received in the connector.

12 Claims, 3 Drawing Sheets

CANTILEVERED NETWORK INTERFACE CARD ASSEMBLY HAVING PORT CONNECTOR ACCESSIBLE FROM REGION OUTSIDE OF COMPUTING DEVICE

BACKGROUND

A computing device, such as a thin client, desktop computer or laptop computer, may be connected to multiple types of networks. For example, a computing device may be connected to wired networks, wireless networks and/or fiber optic networks. To connect the computing device to a given network, a network interface card that is specific to that type of network may be installed in a card slot connector of the computing device.

DETAILED DESCRIPTION

Figure 1A:
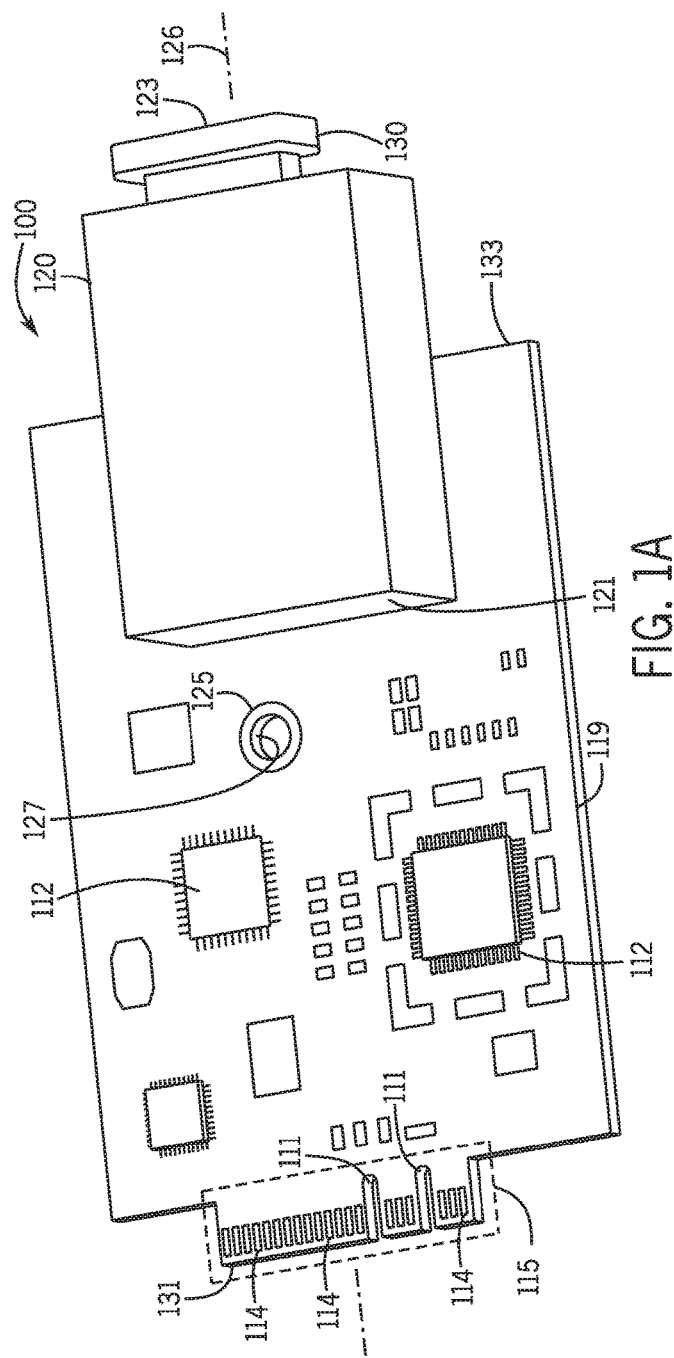
FIG. 1A is a perspective view of a network interface card assembly according to an example implementation.

A given computing device, such as a thin client, tablet computer or notebook computer (as example), may include an internal slot connector for purposes of installing expansion cards in the computing device. For example, for internally mounted computer expansion cards and associated connectors, the computing device may contain an internal slot connector that supports the M.2 specification. In general, the M.2 specification supports expansion cards that use one or multiple of the following buses: the Peripheral Component Interconnect (PCIe) bus, the serial ATA (SATA) bus, and the Universal Serial Bus (USB). An M.2 expansion card may include one or more keying notches, that configure the expansion card to access one or more the aforementioned buses when the card is inserted in an M.2 slot connector. As examples, the expansion card may be a wireless local area network (WLAN) card, a solid state disk (SSD) card, and so forth.

An expansion card may be a network interface card, which communicates with a network using optical or electrical signaling over physical network cables. For example, the network interface card may be an optical fiber network interface card, which forms a communication bridge between the PCIe bus and an optical fiber network. The optical fiber network interface card may be connected to cables that extend between the computing device and components (switches, routers and so forth) of the optical fiber network.

As examples, the optical fiber network may be a Fast Ethernet network (governed by the IEEE 802.30 standard), such as a 100BASE-LX10 network that uses two single-mode optical fiber cables, or a Gigabit Ethernet network (governed by the IEEE 802.3-2008 standard), such as a 100BASE-LX network that uses two single-mode optical fiber cables. An optical fiber network card may be used to connect other optical fiber networks (networks using single, multimode optical fibers). A particular challenge with using an M.2 slot connector for an optical fiber network card, however, is that the M.2 slot connector is nominally associated with an internal expansion card, which is entirely enclosed inside the computing device. In this manner, the M.2 expansion card is nominally constructed to be internally mounted inside the computing device, such that the housing of the computing device completely encloses the card, thereby precluding access to the card for purposes of connecting the card to the optical fiber cables.

One solution for installing an M.2 optical fiber network interface card in a computing device is to install the card in an M.2 slot connector of the computing device, connect internal optical fiber cables to the card (i.e., cables that are confined within the housing of the computing device), and extend these cables to an optical fiber connector that is mounted to a chassis of the computing device. In this manner, the optical fiber connector may contain optical fiber connectors for purposes of allowing external optical fiber network cables to be plugged in and connect to the optical fiber network.

In accordance with example techniques and systems that are disclosed herein, a network interface card assembly, such as an M.2 expansion card assembly, has a port connector and a circuit card substrate. The circuit card substrate is constructed to be received in an expansion card connector slot (an M.2 slot, for example) of a computing device, and the port connector is accessible from a region outside of the computing device for purposes of allowing the expansion card to connect to external network cables. As described herein, in accordance with example implementations, the network interface card assembly contains a cantilevered network communication module that is mounted to the circuit card substrate and contains the port connector.

More specifically, referring to FIG. 1A, in accordance with example implementations, a network interface card assembly 100 includes a circuit board, or substrate 119, which contains a card edge 115 that is constructed to be received in a connector slot that is disposed on a motherboard of a computing device. In accordance with example implementations, the network interface card assembly 100 is constructed to be inserted into an M.2 interface-based slot connector (disposed on the motherboard), and the connector edge 115 includes conductive pins, or traces 114, as well as one or more recesses 111 to key the network interface card to access Peripheral Component Interconnect express (PCIe) bus traces of the M.2 slot connector.

In general, the network interface card assembly 100 includes an electrical-to-optical conversion module 120, which is mounted to the circuit substrate 119 and which is electrically coupled to various integrated circuits 112 of the circuit substrate 119 for purposes of communicating with the PCIe bus and establishing a bridge between the PCIe bus and the electrical-to-optical conversion module 120. In this manner, in accordance with example implementations, the electrical-to-optical conversion module 120 receives electrical signals associated with the PCIe bus and converts these signals into optical signals that are associated with an optical fiber network, such as optical signals associated with a Fast or Gigabit Ethernet optical fiber network (as examples)

Figure 1B:
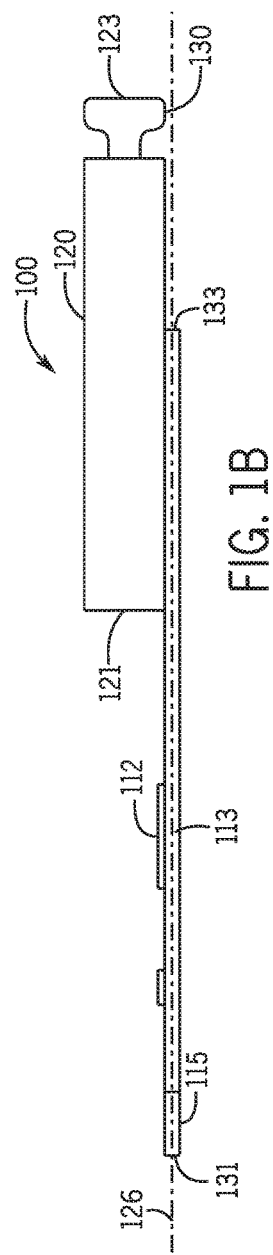
FIG. 1B is a side view of the network interface card assembly of FIG. 1B according to an example implementation.

As depicted in FIGS. 1B and 1A, in accordance with example implementations, the network interface card assembly 100 may be elongated about a longitudinal axis 126, such that the connector edge 115 is disposed at one end 131 of the circuit substrate 119, and the electrical-to-optical conversion module 120 is disposed near the opposite end 133 of the circuit substrate 119. Moreover, the electrical-to-optical conversion module 120 may extends in a cantilevered fashion away from the end 133 of the circuit substrate 119, as depicted in FIGS. 1A and 1B. In this manner, one end 121 of the electrical-to-optical conversion module 120 may be attached, or mounted, to the circuit substrate 119 near its end 133, and the electrical-to-optical conversion module 120 may extend away from the end 133. The electrical-to-optical conversion module 120 has a port connector interface 130 at its distal end 123 (the end farthest from the end 121 along the axis 126) for purposes of connecting the network interface card assembly 100 to one or more network cables (optical fiber cables, for example). As described further below, the port connector interface 130 may be exposed outside of the computing device (i.e., the interface 130 is accessible outside of the housing of the computing device), so that network cables remain outside of the computing device.

As a more specific example, in accordance with some implementations, the port connector interface 130 may contain one or multiple of the following optical fiber network connectors: a Subscriber Connector (SC), a Fiber Connector (FC), a Lucent Connector (LC), a Multiple-Fiber Push-On/Pull-Off connector (MPT), an RJ-11 connector, an RJ-45 (Ethernet) connector, a straight tip (ST) connector, or other similar network connectors. Other types of network cables may connect to the network port connector interface 130 in accordance with other implementations, depending on the type of network and/or the network interface card 100 in a particular environment.

Among its other features, the network interface card assembly 100 may include a through hole 127 for purposes of receiving a fastener (a screw, for example) to secure the network interface card assembly 100 to a motherboard (not shown in FIGS. 1A and 1B) of the computing device when the connector edge 115 is inserted into the slot connector on the motherboard. Moreover, as depicted in FIG. 1A, in accordance with some implementations, the through hole 127 may include a trace 125 surrounding the hole 127 for purposes of allowing the fastener to electrically couple the network interface card assembly 100 to the ground plane of the motherboard.

Figure 2:
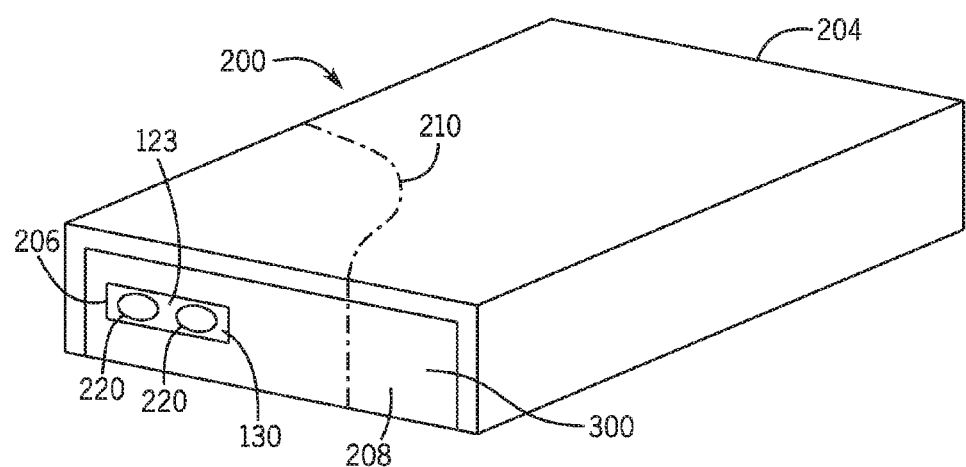
FIG. 2 is a perspective view of a computing device according to an example implementation.
Figure 3:
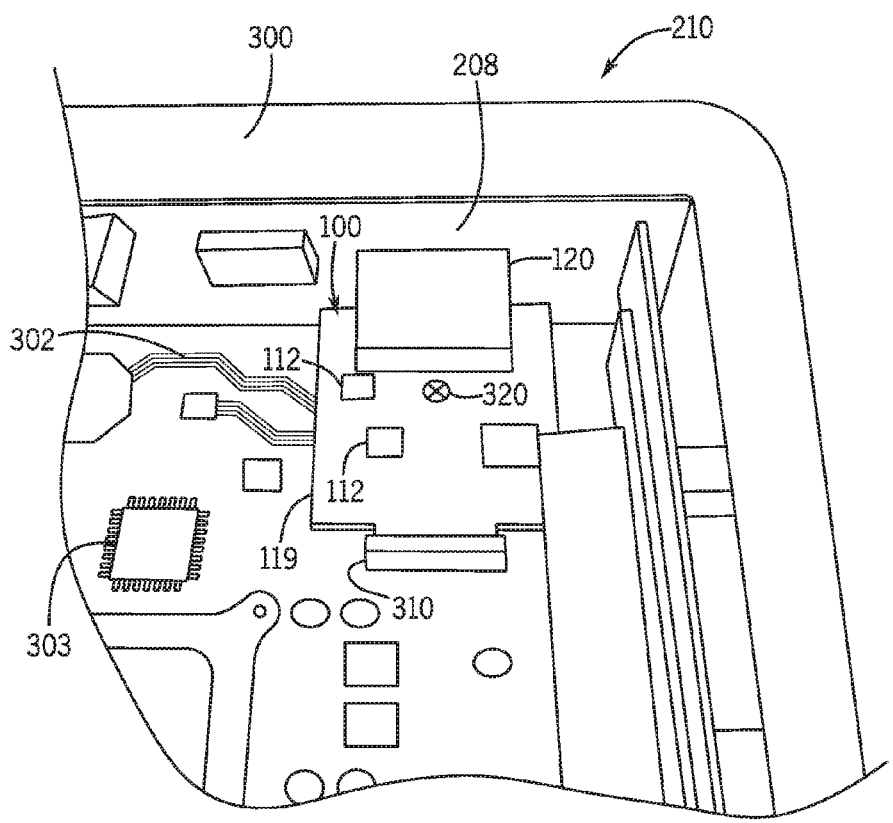
FIG. 3 is a perspective view of a selected portion of the computing device of FIG. 2 according to an example implementation.

Referring to FIGS. 1A, 2 (depicting a computing device 200) and 3 (depicting a selected portion 210 of the computing device 200 with an outer housing 204 removed), in accordance with some implementations, the network interface card assembly 100 may be installed inside a computing device 200. In general, the computing device 200 is a processor-based system, i.e., the computing device 200 includes one or multiple central processing units (CPUs) 303 (FIG. 3), which are mounted on a motherboard 302 of the computing device 200. In this context, a "motherboard" refers to an assembly of the computing device 200, which contains a main circuit substrate, or circuit board, and which contains connectors for the CPU(s) 303, as well as one or multiple slot connectors 310 for expansion cards. For the specific example implementation described herein, the computing device 200 includes one or multiple M.2 interface slot connectors 310, and the card edge 115 of the network interface card assembly's substrate 119 is constructed to be received inside the slot connector 310 for purposes of mechanically attaching the assembly 100 to the motherboard 302 and electrically coupling the traces 114 (FIG. 1A) to corresponding electrical contacts (not shown) inside the connector 310. In accordance with example implementations, the slot connector 310 may have electrical contacts associated with the following buses: PCIe, SATA and USB. Moreover, in accordance with example implementations, the circuit substrate 119 of the network interface card assembly 100, when installed in the slot connector 310, generally resides in a plane that is generally, or substantially, parallel to the motherboard 302 (i.e., the slot connector 310 may be a ninety degree connector). As shown in FIG. 3, a fastener, such as a screw 320, may be used to further secure the network interface card assembly 100 to the motherboard 302 and couple the ground planes of the assembly 100 and motherboard 302 together. The network interface card assembly 100 may be inserted into a slot connector, which orients the assembly 100 orthogonally with respect to the motherboard 302, in accordance with further example implementations.

As depicted in the example implementation of FIGS. 2 and 3, when installed in the slot connector 310, the network interface card assembly 100 extends to a rear face 208 of a chassis 300 of the computing device 200. In particular, the electrical-to-optical conversion module 120 of the network interface card assembly 100 is positioned so that the port connector interface 130 is exposed in an opening 206 in the rear face 208 of the chassis 300. As depicted in FIG. 2, one or multiple port connectors 220 of the electrical-to-optical conversion module 120 may be exposed outside of a housing 204 of the computing device 200 for purposes of allowing one or multiple network cables to be connected to the network interface card assembly 100.

Figure 4:
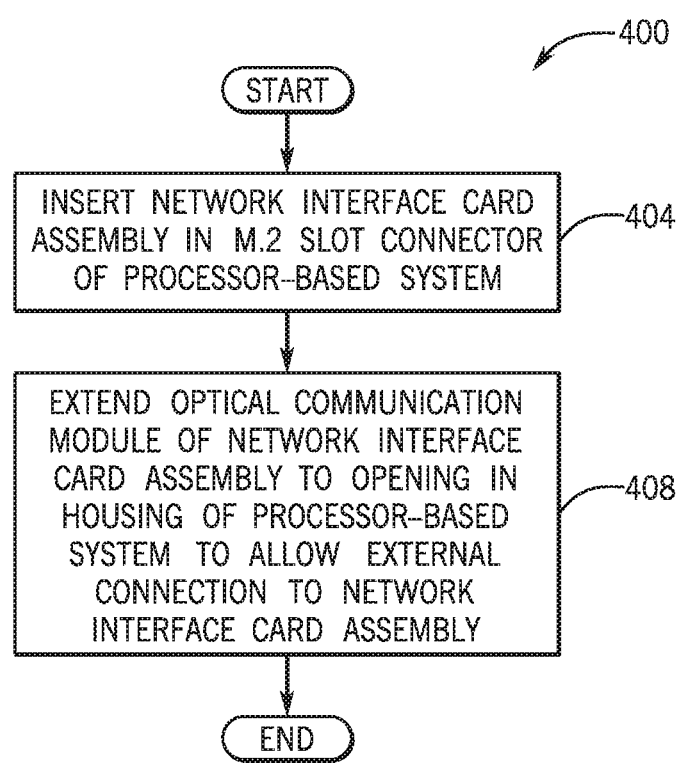
FIG. 4 is a flow diagram depicting a technique to install a network interface card assembly in an M.2 slot connector and mount the network interface card assembly to a computing device according to an example implementation.

Thus, referring to FIG. 4, in accordance with example implementations, a technique 400 includes coupling (block 404) a network interface card assembly to an M.2 slot connector of a processor-based system. Pursuant to the technique 400, an optical communication module of the network interface card assembly is extended to an opening in a housing of the processor-based system to allow an external connection to the network interface card assembly, pursuant to block 408.

While the present techniques have been described with respect to a number of embodiments, it will be appreciated that numerous modifications and variations may be applicable therefrom. It is intended that the appended claims cover all such modifications and variations as fall within the scope of the present techniques.

What is claimed is:

1. A system comprising:
   a computing device comprising a housing, wherein the housing comprises a port opening;
   a motherboard disposed in the enclosed space comprising a central processing unit (CPU) mounted and a slot connector; and
   a network interface card assembly comprising:
      a circuit card comprising a connector edge to be inserted into the slot connector; and
      a cantilevered network communication module mounted to the circuit card and comprising a port connector, the module to extend to the port opening of the housing to allow access to the port connector from a region outside of the housing.

2. The system of claim 1, wherein the slot connector is nominally associated with an expansion card that, when installed in the slot connector, is physically enclosed within the computing device.

3. The system of claim 1, wherein the slot connector comprises an M.2 interface connector.

4. The system of claim 1, wherein the network interface card assembly comprises a fiber optics network interface card assembly.

5. The system of claim 1, wherein the port connector comprises a subscriber connector, a lucent connector or a straight tip connector.

6. The system of claim 1, wherein the circuit card, when the connector edge is inserted into the slot connector, is generally planar with the motherboard.

7. The system of claim 1, wherein the network communication module comprises an electrical-to-optical conversion module.

8. The system of claim 1, wherein the slot connector comprises electrical contacts associated with a storage drive interface and electrical contacts associated with a PCIe interface.

9. An apparatus comprising:
- a circuit card substrate associated with a network interface card and comprising a connector edge to be received in an M.2 slot connector disposed inside a computing device;
- a port connector mounted to the circuit card substrate, the port connector to be accessible from a region outside of the computing device when the connector edge of the circuit card substrate is received in the M.2 slot connector; and
- an electrical-to-optical conversion module mounted on the circuit card substrate and comprising the port connector,
- wherein the apparatus is elongated between a first end and a second end, the port connector is disposed at the first end, and the electrical-to-optical conversion module is disposed at the second end.

10. The apparatus of claim 9, wherein the circuit card substrate comprises an opening to receive a fastener to secure the circuit card to the motherboard.

11. A method comprising:
- inserting a network interface card assembly in an M.2 slot connector of a processor-based system, wherein inserting the network interface card assembly in the M.2 slot connector comprises mounting the network interface card assembly in a ninety degree connector slot of a motherboard of the processor-based system; and
- extending an optical communication module of the network interface card assembly to an opening in a housing of the processor-based system to allow an external connection to the network interface card.

12. A method comprising:
- inserting a network interface card assembly in an M.2 slot connector of a processor-based system; and
- extending an optical communication module of the network interface card assembly to an opening in a housing of the processor-based system to allow an external connection to the network interface card, wherein extending the optical communication module comprises mounting the module to a chassis of the processor-based system to allow access to the port connector through an opening in a chassis of the processor-based system.

* * * * *